2,965,676
Patented Dec. 20, 1960

2,965,676
PREPARATION OF TERTIARY HYDROCARBON DERIVATIVES OF OXAMIDE

William L. Fierce, Crystal Lake, and Walter J. Sandner, Carpentersville, Ill., assignors to The Pure Oil Company, Chicago, Ill., a corporation of Ohio No Drawing. Filed Apr. 28, 1958, Ser. No. 731,099

8 Claims. (Cl. 260—561)

This invention relates to new and useful improvements and processes for preparation of tertiary hydrocarbyl derivatives of oxamide and more particularly to an improved process for preparation of oxamide derivatives by reaction of cyanogen with a tertiary hydrocarbyl monohalide in the presence of a silver-ion donor.

Derivatives of oxamide are well known in the literature and are useful as intermediates in the preparation of various organic compounds. In the past, oxamide derivatives have been prepared by condensation of an amine and oxalic acid.

It is one object of this invention to provide a new and improved method for preparation of tertiary hydrocarbyl derivatives of oxamide.

Another object of this invention is to provide an improved process for preparation of derivatives of oxamide using cyanogen as the starting material.

A feature of this invention is the provision of a process of preparation of tertiary hydrocarbyl derivatives of oxamide by reaction of a tertiary hydrocarbyl monohalide with cyanogen in the presence of a silver-ion donor.

Another object of this invention is the provision of the process for preparation of N,N'-di-tertiary-alkyl derivatives of oxamide by reaction of a tertiary-alkyl halide with cyanogen in an inert solvent in the presence of a silver-ion donor.

Other objects and features of this invention will become apparent from time to time throughout the specification and claims as hereinafter related.

This invention is based upon the discovery that tertiary hydrocarbyl derivatives of oxamide may be prepared by reacting a tertiary hydrocarbyl monohalide with cyanogen in at least a 2:1 mol ratio in an inert polar solvent in the presence of sufficient amount of a silver-ion donor to react with all of the hydrocarbyl halide. An intermediate product is formed which is then hydrolyzed to produce a N,N'-di-tertiary-hydrocarbyl oxamide. In this process any tertiary hydrocarbyl monohalide may be used. The preferred hydrocarbyl halides for this process are of the formula:

where $R^1$, $R^2$ and $R^3$ are of the group consisting of $C_1$–$C_{20}$ alkyl and aryl radicals, and X is of the group consisting of chlorine, bromine and iodine, e.g., t-butyl bromide, t-butyl iodide, t-butyl chloride, t-amyl bromide, t-hexyl bromide, t-decyl iodide, t-octadecyl bromide, tri-(octyl) methyl bromide, diphenyl ethyl methyl iodide, triphenyl methyl bromide, tri-benzyl methyl bromide, and tri-octylphenyl methyl bromide. Silver-ion donors which may be used in this process include any silver compound which ionizes sufficiently to provide a silver-ion capable of reacting with the halogen atom in the hydrocarbyl halide molecule, the anion of donor is inert under conditions of the reaction. Suitable silver compounds are silver sulfate, silver nitrate, silver nitrite, and silver acetate.

In the following examples there are described several preferred embodiments of this invention. However, it should be understood that the invention is not intended to be limited to these specific embodiments.

Example I

A glass vial of 200 cc. volume was charged with 30 g. of tertiary-butyl bromide, 80 g. of benzene and 30 g. of powdered silver sulfate. This mixture was frozen in a Dry Ice-acetone bath and 19.5 g. of cyanogen were added. The vial was then sealed and held at room temperature for seven days. Then the vial was immersed in a Dry Ice-acetone bath and opened. The vial was allowed to warm to room temperature and gaseous components allowed to escape into a hood. The liquid product remaining was mixed with dilute sodium hydroxide in a separatory funnel. To hydrolyze the intermediate product formed in the reaction, the organic layer was washed with dilute HCl and then with water until neutral. The organic layer was then evaporated to yield a yellow-white solid. This solid was recrystallized from anhydrous ether to give a white solid in the form of needle-shaped crystals melting at 173°–174° C. A sodium fusion test indicated the absence of halogens and the presence of nitrogen. The solid was difficultly soluble in ether and water, and easily soluble in alcohol. The melting point and other properties determined for this product correspond to the reported properties of N,N'-di-tertiary-butyl oxamide.

Example II

When this process was repeated in two different runs substituting N-butyl bromide and secondary-butyl bromide, respectively, for the tertiary-butyl bromide the desired oxamide derivatives was not formed. It, therefore, appears that this process is limited to reactions using tertiary hydrocarbyl halides.

Example III

In another experiment the reaction conditions of Example I were duplicated except that the reaction was terminated after one day. A small yield of the N,N'-di-tertiary-butyl oxamide crystals was obtained.

Example IV

The reaction conditions of Example I were followed, substituting tertiary-butyl chloride for the bromide used in Example I. The reaction was allowed to proceed for seven days. When the reaction vial was broken open and the product treated as in Example I, crystals of N,N'-di-tertiary-butyl oxamide were obtained.

Example V

Triethylmethyl iodide, silver acetate, and cyanogen, in a 2:2:1 mol ratio, are placed in a glass vial in suspension in diethyl ether and sealed. The vial is held at room temperature for five days and then opened and the gaseous product allowed to escape into a hood. The liquid remaining is hydrolyzed with dilute aqueous sodium hydroxide and the organic layer washed with dilute HCl and then with water until neutral in pH. On evaporation of the solvent, crystals of N,N'-di-(triethylmethyl) oxamide are obtained.

Example VI

Diphenyl ethyl methyl bromide, silver nitrate, and cyanogen, in a 2:2:1 mol ratio, are sealed in a glass vial with n-hexane as the reaction medium. The vial is maintained at room temperature for five days and then opened and the gaseous components allowed to escape into a hood. The liquid which remains is hydrolyzed with dilute aqueous sodium hydroxide and the organic layer washed with dilute HCl and this with water until neutral in pH. When the liquid reaction medium is evaporated crystals of N,N'-di-(diphenylethyl)methyl oxamide are obtained.

*Example VII*

Triphenyl methyl iodide, silver sulfate and cyanogen in a 2:1:1 mol ratio are charged to a glass vial containing petroleum ether as diluent. The vial is sealed and maintained at room temperature for a period of six days. When the vial is opened and the product hydrolyzed, and separated as in Example I, there are obtained crystals of N-N'-di-(triphenylmethyl) oxamide.

While we have described several preferred embodiments of our invention, as required by the patent laws, we wish it understood that the invention should not be limited to the specific embodiments disclosed, and within the scope of the appended claims, this invention may be practiced otherwise than as specifically described.

What is claimed is:

1. A method for preparation of tertiary hydrocarbon derivatives of oxamide of the formula:

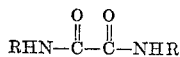

where R is a tertiary hydrocarbon radical derived from a tertiary hydrocarbon halide as hereinafter defined, which comprises reacting a tertiary hydrocarbon monohalide of the formula:

where $R^1$, $R^2$ and $R^3$ are selected from the group consisting of $C_1$–$C_{20}$ alkyl and phenyl radicals, and X is of a group consisting of chlorine, bromine and iodine, with cyanogen in at least a 2:1 mol ratio in an inert, non-aqueous, polar, organic solvent in the presence of a silver compound having an inert anion in an amount sufficient to provide silver ions to react with all of the halogen in the hydrocarbon monohalide, and hydrolyzing the intermediate product to recover a N,N'-di-tertiary-hydrocarbon oxamide.

2. A method in accordance with claim 1 in which $R^1$, $R^2$, and $R^3$ are each ethyl radicals.

3. A method in accordance with claim 1 in which $R^1$ and $R^2$ are phenyl and $R^3$ is ethyl.

4. A method in accordacne with claim 1 in which $R^1$, $R^2$, and $R^3$ are each phenyl radicals.

5. A method in accordance with claim 1 in which the solvent used is benzene.

6. A method in accordance with claim 1 in which the silver compound is silver sulfate.

7. A method for preparation of tertiary-butyl derivatives of oxamide which comprises reacting a tertiary-butyl halide, selected from the group consisting of the bromide, chloride, and iodide, with cyanogen in at least a 2:1 mol ratio in an inert, non-aqueous, polar, organic solvent in the presence of a sufficient amount of a silver compound having an inert anion to react with all of the halogen, and hydrolyzing the intermediate product to produce N,N'-di-tertiary-butyl oxamide.

8. A method in accordance with claim 7 in which the tertiary-butyl halide used is the bromide and the reaction is carried out in benzene at room temperature.

References Cited in the file of this patent
UNITED STATES PATENTS 2,628,217    Magat _____ Feb. 10, 1953

OTHER REFERENCES

Lusskin, J.A.C.S., vol. 72, December 1950, p. 5577.